United States Patent [19]

Kobayashi

[11] 3,947,020
[45] Mar. 30, 1976

[54] DEVICE FOR AUTOMATICALLY SEPARATING A PHOTOSENSITIVE SHEET FROM AN ORIGINAL FOR COPYING APPARATUS

[75] Inventor: Yugoro Kobayashi, Tokyo, Japan
[73] Assignee: Ricoh Co., Ltd., Tokyo, Japan
[22] Filed: Dec. 26, 1974
[21] Appl. No.: 536,462

Related U.S. Application Data

[63] Continuation-in-part of Ser. No. 378,820, July 13, 1973, abandoned.

[30] Foreign Application Priority Data
July 21, 1972 Japan.............................. 47-72492

[52] U.S. Cl................................ 271/172; 271/197
[51] Int. Cl.².......................................... B65H 29/64
[58] Field of Search................ 271/172, 197, 276; 355/106

[56] References Cited
UNITED STATES PATENTS

| | | | |
|---|---|---|---|
| 1,980,188 | 11/1934 | Cullen et al. | 271/172 |
| 2,373,040 | 4/1945 | MacDonald et al. | 355/106 |
| 3,408,065 | 10/1968 | Goodman et al. | 271/172 |
| 3,490,764 | 1/1970 | Muller et al. | 271/197 X |

*Primary Examiner*—Evon C. Blunk
*Assistant Examiner*—Bruce H. Stoner, Jr.
*Attorney, Agent, or Firm*—Cooper, Dunham, Clark, Griffin & Moran

[57] ABSTRACT

A device for separating a copy sheet and an original that are delivered together by copying apparatus along a common path, including suction means for drawing the original from the path and a curved guide plate for guiding the copy sheet as the original is separated therefrom. The suction means, disposed at one side of the common path, includes a curved suction surface and plural apertured endless belts passing over the surface in position for register of apertures of the belts with suction openings formed in the surface. The guide plate, disposed at the opposite side of the common path, has a sheet-engaging surface with a degree of curvature, relative to the last-mentioned path, that is less than the curvature of the suction surface but greater than a predetermined curling limit of the copy sheets being separated.

3 Claims, 4 Drawing Figures

DEVICE FOR AUTOMATICALLY SEPARATING A PHOTOSENSITIVE SHEET FROM AN ORIGINAL FOR COPYING APPARATUS

CROSS-REFERENCE TO RELATED APPLICATION

This application is a continuation-in-part of applicant's copending U.S. Pat. application Ser. No. 378,820, filed July 13, 1973 now abandoned.

BACKGROUND OF THE INVENTION

This invention relates to a device for automatically separating a photosensitive sheet from an original for copying apparatus, particularly of the type using a diazo photo-sensitive sheet.

In a typical example of copying apparatus with which the present invention may be employed, an original to be copied and a photosensitive copy sheet are advanced, in surface-to-surface contact with each other, past a printing station where an image of the original is established on the copy sheet by exposure to light. As delivered from the printing station, the original and copy sheet are still in contact, and must be separated from each other, e.g. to enable subsequent developing treatment of the copy sheet. A separating device is accordingly disposed at a suitable locality in the common delivery path of the original and copy sheet beyond the printing station.

Heretofore, to effect automatic separation of a photosensitive sheet from an original in such copying apparatus, it has been customary to employ a device wherein a suction tank is provided both on the original side and on the photosensitive sheet side of the delivery path, to draw the original and photosensitive sheet apart by suction by means of blowers of large capacity.

In a device of the type described, the photosensitive sheet (herein also termed the copy sheet) is drawn by a suction force of the blower which is exerted on the sheet through openings formed in a suction plate of the suction tank and gaps formed between a plurality of belt elements making up a conveyor belt interposed between the plate and sheet for advancing the sheet. This device has a disadvantage in that, since there is a clearance between the photosensitive sheet and the suction plate, a large quantity of air tends to flow from outside into the suction tank through this clearance, and it becomes necessary to use a blower of a greater capacity than would otherwise be required, in order to permit the suction force of the blower to achieve satisfactory results in drawing the copy sheet without interference by the large quantity of air flowing from atmosphere into the suction tank.

SUMMARY OF THE INVENTION

An object of the present invention is to provide a copy sheet-original separating device, compact in size and high in efficiency, which obviates the aforementioned disadvantage of the prior art in automatically separating a copy sheet from an original.

To this and other ends, the present invention broadly contemplates (as one feature or aspect thereof) the provision of a separating device for copying apparatus including a guide plate of particular configuration for guiding a copy sheet, and suction means having a curved suction surface for conducting an original, disposed along the delivery path of an original and copy sheet that are initially in surface-to-surface contact with each other. Specifically, in accordance with the invention, the copy sheet guide plate has a curved guide surface with a degree of curvature greater than the practical forward curling limit (as hereinafter defined) of the copy sheet while the curved suction surface of the suction means has a degree of curvature greater than that of the copy sheet guide plate. The copy sheet plate is disposed, in the delivery path, to face that surface of the copy sheet which faces away from the original, while the suction surface is disposed to engage that surface of the original which faces away from the copy sheet. The curvature of the copy sheet guide plate is concave toward the copy sheet while the curvature of the suction surface is convex toward the original.

This device is arranged to cooperate with means, provided in the copying apparatus, for advancing the original and copy sheet together along the delivery path. The suction means draws the original from the path as the original and copy sheet advance, while the copy sheet guide plate is positioned to engage and guide the copy sheet (in a path leading away from the original) toward further sheet-advancing means, e.g. delivery rollers.

That is to say, in one aspect of the invention, the aforementioned object can be accomplished by guiding the photosensitive sheet by a guide plate having a curved surface whose degree of curvature is higher than the practical curling limit of the photosensitive sheet, and by guiding the original to move along a curved surface having a higher degree of curvature than the photosensitive sheet guide plate while drawing the original by suction means disposed beneath the original guide surface whereby the photosensitive sheet and the original can be automatically separated from each other.

The original occurs in different qualities, thicknesses and sizes so that it is beyond the power of copying apparatus manufacturers to control its degree of curling while it is in stock. However, the photosensitive sheet can have its degree of curling controlled by copying apparatus manufacturers while it is in the process of production or while being stored following production. That is, each type of photosensitive sheets can be allowed to curl up either in the direction of their photosensitive surface or in an opposite direction, and the maximum degree to which the sheets curl up in any direction under normal conditions can be adjusted to a predetermined level. Stated differently, photosensitive sheets can be allowed to curl up in the direction of their photosensitive surface and the degree to which the sheets curl up or the forward curling value $f$ with respect to the reference plane $S$ can be adjusted to a predetermined level, or they can be made to curl up in an opposite direction and the degree to which they curl up or the back curling value $b$ can be adjusted to a predetermined level. This predetermined level or the maximum curling limit is referred to as the practical curling limit of photosensitive sheets.

Curling of a copy sheet in the direction of its photosensitive surface is herein termed forward curling; if the sheet tends to curl in the opposite direction, its forward curling value may be considered negative. The present invention is specifically concerned with devices capable of handling copy sheets that exhibit forward curling.

In accordance with a further particular feature or aspect of the invention, the suction means of the device includes a suction tank having a suction plate or surface and a plurality of belt elements movable over that surface. A number of openings are formed in and disposed lengthwise of each of the plurality of belt elements (which together comprise a conveyor belt for advancing an original), and a number of small suction openings are formed in the suction plate of the suction tank in positions on which the openings of the belt elements move in operation, so as to eliminate communication of the gaps between adjacent belt elements with the suction openings of the suction tank. This arrangement permits the original to be drawn to the original conveyor belt by a low suction force exerted on the original through the suction openings in the suction tank and the openings in the belt elements, eliminating the need to use a blower of large capacity as in conventional devices of a similar type. Thus, the present invention permits attainment of the object of attracting the original to the conveyor belt to convey the same by using an economical blower of a compact size.

According to the invention, the suction tank has only to be provided on the original side of the delivery path. The blower used for drawing the original to the conveyor belt can be of a compact size because the quantity of fluid drawn by suction by the blower to attract the original to the conveyor belt need not be so great as the quantity of fluid which must be drawn in the conventional original-photosensitive sheet separation device described above.

Other objects and features of the invention are pointed out in the following description in terms of the embodiment thereof which is shown in the accompanying drawings.

DETAILED DESCRIPTION

Figure 1:
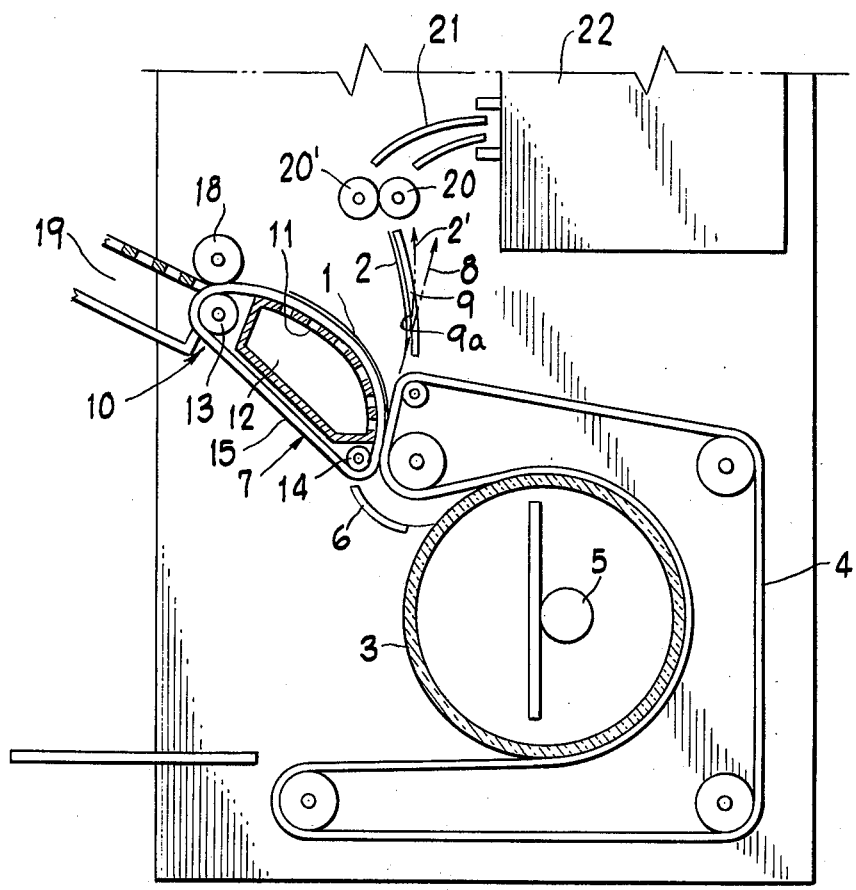
FIG. 1 is a schematic vertical sectional view of a copying apparatus incorporating therein the automatic separation device according to the invention.

In FIG. 1, an original 1 and a photosensitive sheet 2 superposed one on the other and inserted in the copying apparatus are exposed to light rays emanating from a light source 5, and the image of the original 1 is printed on the photosensitive sheet 2 while they are held between an endless belt 4 and a transparent cylinder 3 and moving along the periphery of the cylinder 3. They are removed from the cylinder 3 by a pick-off 6 and fed to a separation device 7.

The separation device 7, embodying the present invention, comprises a guide plate 9 having a surface which is slightly curved toward the original side from a predetermined course of movement (line 8) of the photosensitive sheet emerging from the pick-off 6, suction means 10 comprising a suction tank 12 provided with a curved suction surface 11, and an original endless conveyor belt 15 consisting of a plurality of belt elements trained over rollers 13 and 14 and surrounding the suction tank 12 so that the belt 15 may move along the curved suction surface 11. The degree of curvature of the curved surface 9a of guide plate 9 is set at a level which is higher than the practical forward curling limit of the photosensitive sheet 2.

Figure 4:
FIG. 4 is a view in explanation of the practical curling limit of a photosensitive sheet.

FIG. 4 illustrates the two possible directions of curling of the copy sheet 2. If the copy sheet curls in the direction of its photosensitive surface, its forward curling limit is indicated by $f$ in FIG. 4, representing the extent of departure of the sheet extremities in the forward direction from reference plane S. The surface 9a of guide plate 9 should have a curvature (with respect to line 8, FIG. 1) greater than that represented by $f$. If, on the other hand, the copy sheet curls in a direction opposite to the photosensitive surface, its back curling limit is represented by $b$ in FIG. 4. In this instance, the forward curling of the copy sheet may be considered as negative; the described positive curvature of guide plate surface 9a is still greater than this negative forward curling.

Referring again to FIG. 1, the original 1 emerging from the pick-off 6 is drawn by the suction force of the suction means 10 and moves along the suction surface 11 of the suction tank 12 which is made to have a higher degree of curvature than the guide plate 9 for the photosensitive sheet 2, so that the paths respectively defined by the suction surface 11 and the guide plate surface 9a are divergent. On the other hand, the photosensitive copy sheet 2 emerging from the pick-off 6 separates itself from the original 1 as the original is drawn to the suction surface 11, and the copy sheet moves forwardly under no suction and reaches the guide plate 9. Therefore, it moves along its predetermined path while being guided by the surface 9a of the guide plate 9 which faces the copy sheet and the original.

Figure 2:
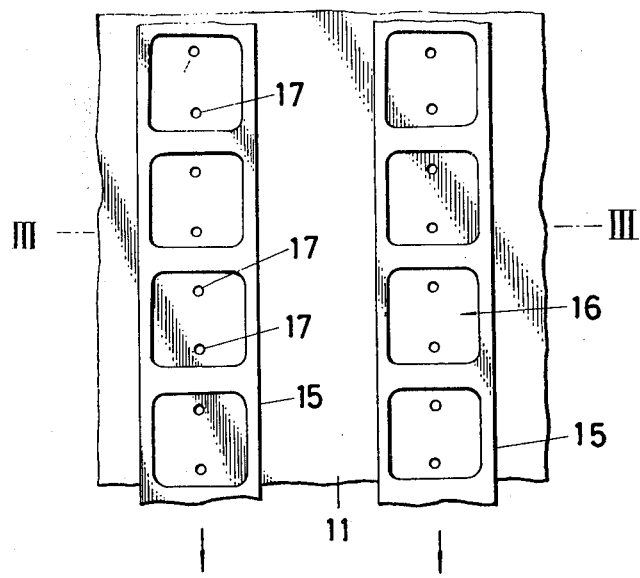
FIG. 2 is a plan view of the suction means.
Figure 3:
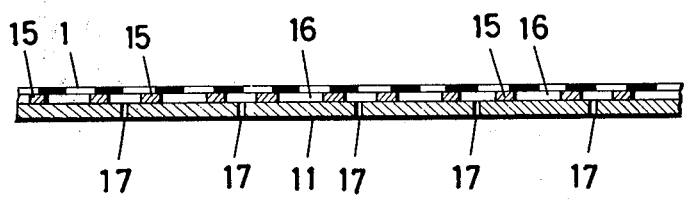
FIG. 3 is a sectional view taken along the line III—III of FIG. 2.

The belt elements of the original conveyor endless belt 15 are formed therein with a number of openings 16 arranged lengthwise thereof while a number of small suction openings 17 are formed in the suction surface 11 of the suction tank 12 in positions on which the upper runs of the belt elements having the openings 16 move in operation, so that the small suction openings 17 are successively in register with the larger openings 16 of the belt, as illustrated in FIG. 2. The suction tank 12 is connected to a blower (not shown).

The photosensitive sheet 2 is guided along the guide plate 9 after emerging from the pick-off 6, but the original 1 is attracted to the endless conveyor belt 15 because it is drawn by a suction force exerted thereon through the suction openings 17 and the openings 16 in the belt elements of the conveyor belt 15, so that the original 1 moves with the belt 15 while being attracted thereto as the belt 15 moves along the suction surface 11 of the suction tank 12.

The original 1 is held between a delivery roller 18 and the conveyor belt 15 which is pressed against the delivery roller by the roller 13 at the exit end of the suction means 10 and ejected through an original outlet 19 from the apparatus.

On the other hand, the photosensitive sheet 2 moving along the guide plate 9 is nipped by delivery rollers 20 and 20' disposed at the exit end of the guide plate 9 and moved along another guide plate 21 to a developing station 22 where the image thereon is developed so that the photosensitive sheet is converted into a copy or duplicate of the original and ejected onto a copy tray.

In other words, as the original 1 and copy sheet 2 converge together from the pick-off 6, they diverge because the original is drawn by suction along surface 11 while the copy sheet is not subjected to the suction, being insulated therefrom by the original. If the copy sheet had no forward curling tendency, it would advance along path 8. However, a copy sheet having a forward curling tendency advances along a path as indicated at 2' intermediate path 8 and surface 11 though still divergent from surface 11. In the absence of plate 9, the position of the leading edge of the copy sheet 2 at a given distance beyond pick-off 6 would not be precisely or positively determinable, and it would therefore be difficult to bring the copy sheet into assured proper engagement with further sheet-advancing means as desired for delivery thereof e.g. to a developing station.

Plate 9 is so disposed that the concave guide surface 9a thereof (facing, but diverging from, the suction surface 11) is engaged by the leading edge of a copy sheet 2 advancing along a path 8 or 2' a short distance beyond the locality at which the original and copy sheet begin to separate. Owing to the fact that the concave curvature of surface 9a is greater than the practical forward curling limit of the sheet 2, the sheet leading edge is maintained in contact with the surface 9a (as the sheet 2 continues to advance) and is positively guided thereby, to the nip of delivery rollers 20 and 20'. As will be appreciated, if the degree of concave curvature of surface 9a were less than the practical forward curling limit of sheet 2, engagement of the sheet with the guide plate would not be assured, and any guiding action of the plate would be haphazard in its effect.

Thus, in short, the invention in this aspect contemplates provision of the described guide plate 9 having a concavely curved surface 9a (with a degree of curvature that is greater than a predetermined value, e.g. greater than the practical forward curling limit of a copy sheet characterized by positive forward curling) facing the suction surface 11 and positioned to be engaged by the leading edge of a copy sheet 2 emerging from the pick-off 6. For all copy sheets having a practical forward curling limit $f$ which is less than the degree of curvature of surface 9a (including sheets that exhibit "negative" forward curling, as defined above), the plate provides assured guidance of the sheet into the nip of the delivery rollers. It will be understood that reference herein to curvature of the suction and guide plate surfaces means curvature in the direction of advance of original and copy sheet, respectively.

From the foregoing description, it will be appreciated that according to the invention, the suction tank is provided on the original side only of the path of advance of the original and copy sheet, and that the original is drawn to the conveyor belt by a suction force exerted on the original from the suction tank through the openings formed in the belt elements of the conveyor belt. Since such openings are prevented from communicating with atmosphere by the original and the suction tank, the original can be fully attracted to the conveyor belt by a suction force high enough to draw air from near such openings, and the suction openings 17 formed in the suction surface of the suction tank can be small in size because they have only to serve the purpose of compensating for the leak of fluid which may occur between the original and the belt. The quantity of fluid drawn from outside into the suction tank through the small openings which are left uncovered by the original because the latter is small in size is very small, so that a blower of a small capacity can be used. Because of this, the separation device according to the invention is smaller in size than conventional separation devices, low in cost and produces less noise because the blower is of a smaller capacity.

In devices of the prior art, when an original alone is inadvertently fed to a copying apparatus or an original alone reaches the separation device in the case of misoperation of an automatic photosensitive sheet supply device of the copying apparatus or for other reasons, it has often happened that the original is fed to the developing station and stained therein by the developing agent in case the original is curled such as to precipitate this situation because two suction tanks are provided on both sides, i.e. for the original and the photosensitive sheet. This disadvantage of the prior art can be eliminated by the present invention, because the suction tank is provided on the original side only and the original never fails to be ejected through the original outlet from the apparatus.

It is to be understood that the invention is not limited to the features and embodiments hereinabove set forth, but may be carried out in other ways without departure from its spirit.

I claim:

1. For use to produce copies of originals, on copy sheets having a practical curling limit not greater than a predetermined value, with copying apparatus wherein an original and a copy sheet are delivered together along a common path, a device for separating an original from a copy sheet, comprising
   a. suction means, disposed adjacent the path on one side thereof in position to face an original advancing therealong, for drawing an original therefrom, said suction means having a convexly curved suction surface facing said path and including at least one conveyor belt movable along said suction surface; and
   b. a stationary guide plate, disposed adjacent the path on the opposite side thereof from, and in facing relation to, the suction means and in position to face a copy sheet advancing along the path between the suction surface and the guide plate, said guide plate having a guide surface facing said path and said suction surface for engaging and guiding an advancing copy sheet to a predetermined locality beyond said guide plate;
   wherein the improvement comprises
   c. said guide surface of said guide plate being curved concavely with a degree of curvature greater than said predetermined value; and
   d. said suction surface having a degree of convex curvature greater than the degree of concave curvature of said guide surface.

2. A device as defined in claim 1, wherein said one belt has a plurality of openings each fully laterally enclosed by material of the belt, and said suction surface has a plurality of small suction openings disposed for register with openings of the belt for application of suction therethrough to an original lying on the belt, said belt openings being individually substantially larger than said suction openings.

3. A device as defined in claim 1, wherein the copying apparatus comprises means, delivering an original and a copy sheet together as aforesaid, for imparting forward motion to the copy sheet to advance the leading edge of the copy sheet past said guide plate; and further including sheet-feeding means disposed at said predetermined locality for engaging the leading edge of a copy sheet to feed the sheet beyond the guide plate; said guide plate surface curving concavely toward said sheet-feeding means for guiding the leading end of an advancing copy sheet thereto.

* * * * *